(12) United States Patent
Yokota et al.

(10) Patent No.: US 9,056,588 B2
(45) Date of Patent: Jun. 16, 2015

(54) CONTROL APPARATUS, AN ON-VEHICLE DEVICE AND A SYSTEM

(75) Inventors: Ryuichi Yokota, Okazaki (JP); Yusuke Oku, Nagoya (JP); Koji Gamo, Nagoya (JP); Makoto Fujino, Miyoshi (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 825 days.

(21) Appl. No.: 13/302,364

(22) Filed: Nov. 22, 2011

(65) Prior Publication Data

US 2012/0065807 A1 Mar. 15, 2012

Related U.S. Application Data

(63) Continuation of application No. PCT/JP2009/059608, filed on May 26, 2009.

(51) Int. Cl.
*G05D 3/12* (2006.01)
*B60R 16/023* (2006.01)
*H02H 3/32* (2006.01)
*G06F 13/12* (2006.01)
*H04N 7/16* (2011.01)

(52) U.S. Cl.
CPC .............. *B60R 16/023* (2013.01); *H02H 3/325* (2013.01)

(58) Field of Classification Search
CPC ... H04L 12/2602; H04L 29/06; H04L 41/024; H04L 43/00; H04L 43/06; H04L 43/106; H04L 43/16; H04L 67/10; H04L 67/12; H04L 67/14; H04L 67/34; H04L 69/08; H04L 69/329; H04L 12/1895; H04L 12/58

USPC ........................ 710/62, 72; 725/149; 700/298
See application file for complete search history.

(56) References Cited

U.S. PATENT DOCUMENTS 3,603,846 A * 9/1971 Toth .............................. 361/187
3,727,128 A * 4/1973 McFerrin ....................... 324/533
3,887,335 A * 6/1975 Boutonnat ....................... 422/95
3,943,306 A * 3/1976 Aihara et al. ............. 191/12.2 R
4,785,265 A * 11/1988 Molnar et al. .................. 333/18

(Continued)

FOREIGN PATENT DOCUMENTS

JP 56-111917 A 9/1981
JP 06-013937 A 1/1994

(Continued)

OTHER PUBLICATIONS

International Search Report dated Aug. 11, 2009 of PCT/JP2009/059608, 1 page.

(Continued)

*Primary Examiner* — Sean Shechtman
*Assistant Examiner* — Thomas Stevens
(74) *Attorney, Agent, or Firm* — Kenyon & Kenyon LLP

(57) ABSTRACT

A control apparatus configured to control communication between an on-vehicle device and a device coupled to the on-vehicle device via a cable, the control apparatus including a cable length detecting part configured to detect a length of the cable and a power supply voltage controlling part configured to control, based on the length of the cable detected by the cable length detecting part, a power supply voltage in a connector connected to the device by changing a power supply voltage applied to a power supply line of the cable.

6 Claims, 11 Drawing Sheets

(56) References Cited

U.S. PATENT DOCUMENTS

| | | | |
|---|---|---|---|
| 4,868,815 A * | 9/1989 | Iwamura et al. | 370/485 |
| 4,962,372 A * | 10/1990 | Swier | 340/640 |
| 5,059,911 A * | 10/1991 | Huber | 324/539 |
| 5,159,275 A * | 10/1992 | Fujimura | 324/617 |
| 5,245,291 A * | 9/1993 | Fujimura | 324/617 |
| 5,339,022 A * | 8/1994 | Fleming et al. | 324/67 |
| 5,428,295 A * | 6/1995 | Beeman | 324/529 |
| 5,479,610 A * | 12/1995 | Roll-Mecak et al. | 714/2 |
| 5,636,214 A * | 6/1997 | Kranzler et al. | 370/438 |
| 5,818,378 A * | 10/1998 | Cheng et al. | 341/155 |
| 6,072,803 A * | 6/2000 | Allmond et al. | 370/445 |
| 6,125,048 A | 9/2000 | Loughran et al. | |
| 6,362,594 B2 * | 3/2002 | Kajiura | 320/104 |
| 6,614,236 B1 * | 9/2003 | Karam | 324/532 |
| 6,633,800 B1 * | 10/2003 | Ward et al. | 701/2 |
| 7,404,091 B1 | 7/2008 | Gere | |
| 8,576,873 B2 * | 11/2013 | Diab | 370/463 |
| 2002/0105344 A1 * | 8/2002 | Bohley | 324/662 |
| 2002/0133239 A1 * | 9/2002 | Rebellius et al. | 700/1 |
| 2004/0122570 A1 * | 6/2004 | Sonoyama et al. | 701/23 |
| 2006/0018193 A1 * | 1/2006 | Chamberlain | 367/59 |
| 2006/0085099 A1 | 4/2006 | Burlak et al. | |
| 2007/0041577 A1 * | 2/2007 | Ghoshal et al. | 379/413 |
| 2008/0172564 A1 * | 7/2008 | Diab et al. | 713/300 |
| 2009/0304059 A1 * | 12/2009 | Bishop | 375/222 |
| 2010/0118984 A1 * | 5/2010 | Liu et al. | 375/258 |

FOREIGN PATENT DOCUMENTS

| | | |
|---|---|---|
| JP | 07-222039 A | 8/1995 |
| JP | 08-242211 A | 9/1996 |
| JP | 2000-181591 A | 6/2000 |
| JP | 2001-053656 A | 2/2001 |
| JP | 2005-018291 A | 1/2005 |
| JP | 2007-110503 A | 4/2007 |
| JP | 2008-305148 A | 12/2008 |

OTHER PUBLICATIONS

Supplementary European Search Report dated Nov. 7, 2012 of EP Application No. 09 845 181.8, 9 pages.

Office Action mailed Jul. 31, 2014 in U.S. Appl. No. 13/302,483, 9 pages.

* cited by examiner

CONTROL APPARATUS, AN ON-VEHICLE DEVICE AND A SYSTEM

CROSS-REFERENCE TO RELATED APPLICATIONS

The present application is a U.S. continuation application filed under 35 U.S.C. 111 (a) and 356 (c) of PCT application No. PCT/JP2009/059608, filed on May 26, 2009, the entire contents of which are hereby incorporated by reference.

TECHNICAL FIELD

The present invention relates to an on-vehicle device, a control apparatus configured to control communications with various devices coupled to the on-vehicle device via USBs, for example, and a system which includes the control apparatus.

BACKGROUND ART

An on-vehicle device is often coupled to various devices (referred to as USB devices, hereinafter) via USBs (Universal Serial Buses). The on-vehicle devices include a car audio, a car navigation device, etc., and the USB devices include a hard disk (HD) drive, a music player, a sensor, etc.

For example, the on-vehicle device has a USB control unit (a USB control apparatus). The USB control unit is coupled to a USB connector. The on-vehicle device is coupled to the USB device by coupling a connector of the on-vehicle device to the USB connector of the USB device via a USB cable. The USB cable includes a power supply line, a communication line and a ground cable.

The USB control unit is coupled to the power supply line for supplying the USB device with electrical power. The USB control unit supplies electrical power with a voltage of +5V (a maximum current capacity of 0.5 A) for the USB device coupled to the on-vehicle device via the USB connector and the power supply line.

The USB device operates based on electrical power supplied from the USB control unit. A guaranteed working voltage range of the USB device complies with specifications. In general, it is DC+5V±5%. The specifications include USB2.0.

JP2008-305148 A discloses related art.

If the USB cable is used to connect between the USB control unit and the USB device, there is a voltage drop in the USB cable. If the length of the USB cable is long, the power supply voltage applied to the USB device via the power supply cable may become lower than a permissible value specified by the specifications because of the voltage drop. The USB device may be unable to operate because the power supply voltage applied to the USB device drops. In other words, because of power consumed by a line resistance which is proportional to the length of the USB cable, the power supply voltage from the power supply of the USB control unit drops and no longer meets the guaranteed working voltage range DC+5V±5% of the USB device.

The maximum transmission distance between the USB control unit and the USB device is specified by the specifications. For example, according to USB2.0, the maximum transmission distance is 5 m. The maximum transmission distance corresponds to the length of the USB cable connecting between the USB control unit and the USB device. Thus, it is necessary to dispose the USB control unit and the USB device such that the length of the USB cable doesn't exceed the distance.

However, depending on a circumstance in a vehicle on which the length of the USB cable is installed, there may be a case where the USB control unit cannot be disposed near the USB device. It can be anticipated that the distance between the USB control unit and the USB device exceeds the maximum transmission distance. If the distance between the USB control unit and the USB device exceeds the maximum transmission distance, a signal transmitted by the signal cable is attenuated to have amplitude below a permissible value specified by the specifications.

In some cases, if the distance between the USB control unit and the USB device exceeds the maximum transmission distance, an amplifier called as a repeater or a booster is provided between the USB control unit and the USB device. The attenuation of the signal is compensated for by the repeater and the voltage drop is compensated for by the booster. However, there may be a case where it is difficult to provide the repeater and/or the booster.

SUMMARY OF INVENTION

Therefore, the present invention is made considering the matters described above, and an object of the present invention is to provide a control apparatus, an on-vehicle device and a system by which it becomes possible to assure communication quality between the control unit and the device without the repeater and/or the booster even if the distance between the control unit and the device exceeds the maximum transmission distance.

In order to achieve the aforementioned objects, according to the first aspect of the present invention, a control apparatus is provided which is configured to control communication between an on-vehicle device and a device coupled to the on-vehicle device via a cable. The control apparatus may include: a cable length detecting part configured to detect a length of the cable; and a power supply voltage controlling part configured to control, based on the length of the cable detected by the cable length detecting part, a power supply voltage in a connector connected to the device by changing a power supply voltage applied to a power supply line of the cable.

Figure 1:
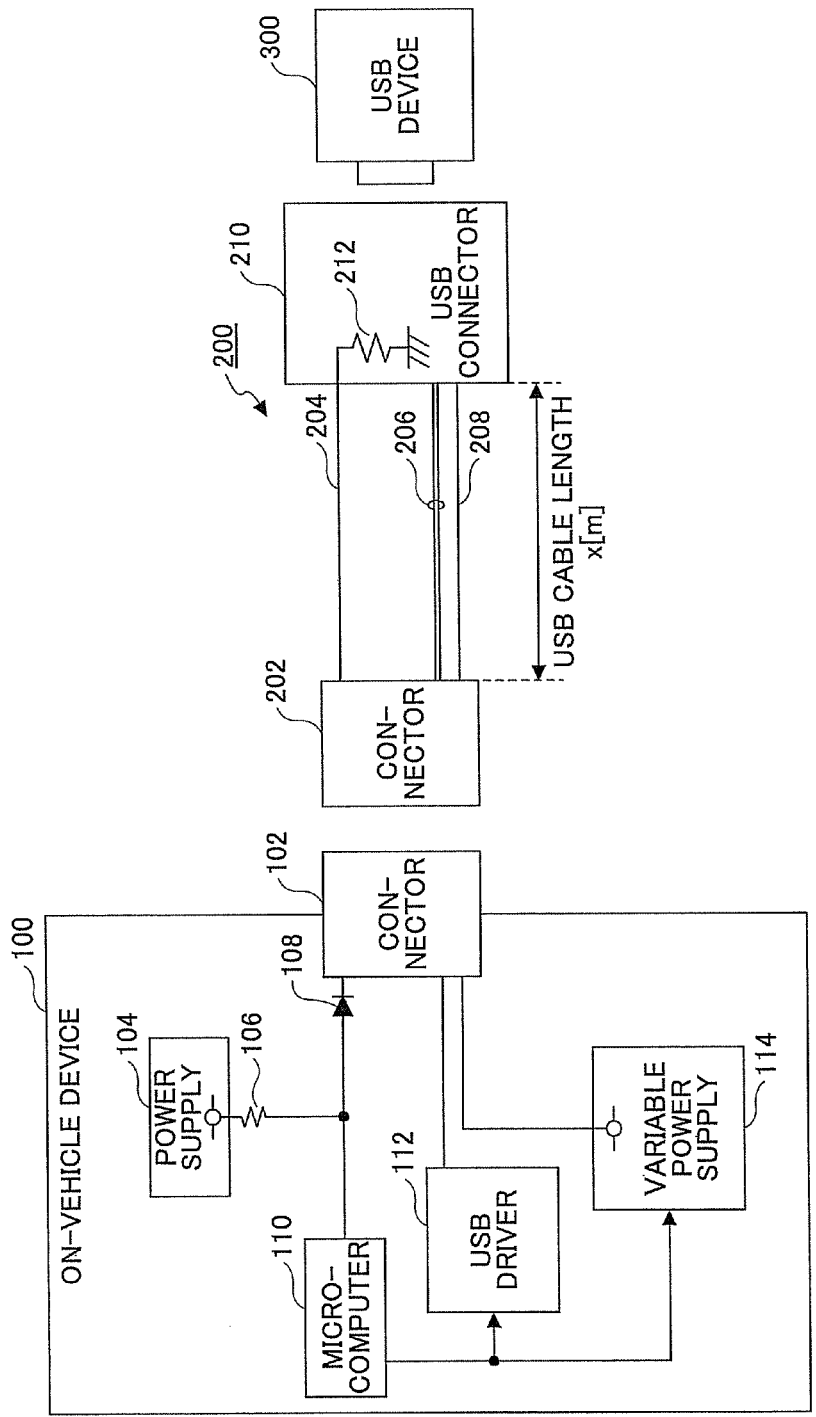
FIG. 1 is a block diagram for illustrating a system to which an on-vehicle device, a USB cable and a USB device according to an embodiment are applied.

EXPLANATION FOR REFERENCE NUMBERS 100 on-vehicle device
102 ($102_1$, $102_2$ and $102_3$) connector
104 power source
106 resistance
108 ($108_1$, $108_2$ and $108_3$) diode
110 microcomputer
1102 analog/digital converter (A/D)
1104 USB cable length determining part
1106 storage part
112 USB driver
114 variable power supply
116 cable length setting part
200 USB cable
202 connector
204 cable length detection line
206 communication line
208 power supply line
210 USB connector
212 resistance
214 cable length detection resistance line
300 USB device

BEST MODE FOR CARRYING OUT THE INVENTION

Next, embodiments for carrying out the present invention will be described in detail by referring to the accompanying drawings.

It is noted that, throughout drawings for explaining embodiments, elements which have the same function are indicated by the same numeral references and repeated explanations thereof are omitted.

First Embodiment

System

FIG. 1 is a functional block diagram for illustrating a system to which an on-vehicle device, a USB cable and a USB device according to an embodiment are applied. According to the embodiment, as an example, an explanation is directed to a case of controlling communications between the on-vehicle device and the USB device which is connected to the on-vehicle device via the USB cable; however, it is not limited to USB applications, and it can be applied to a case of controlling communications between the on-vehicle device and any device which is connected to the on-vehicle device via a cable.

The system includes an on-vehicle device 100, a USB cable 200 and a USB device 300.

The on-vehicle device 100 includes a USB control unit. The USB control unit includes a connector 102, a power supply 104, a resistance 106, a diode 108, a microcomputer 110, a USB driver 112 and a variable power supply 114.

The USB cable 200 includes a connector 202, a cable length detection line 204, a communication line (D+, D−) 206, a power supply line (VBUS) 208 and a USB connector 210. In FIG. 1, an illustration of a ground cable is omitted. Further, an ID line may be included. Further, the USB cable 200 includes a resistance part 212 for detecting the length of the cable. One end of the resistance part 212 is connected to the cable length detection line 204 and another end of the resistance part 212 is connected to the ground.

The maximum length of the USB cable is specified by USB specifications. For example, according to USB2.0, it is specified as 5 m. Thus, the USB cable 200 whose length is shorter than 5 m should be used to connect between the on-vehicle device 100 and the USB device 300. However, there may be a case where a USB cable which connects between the connector 102 and the USB driver 112 and/or the variable power supply 114 is installed in the vehicle when the on-vehicle device 100 is installed in the vehicle. In the case where the USB cable which connects between the connector 102 and the USB driver 112 and/or the variable power supply 114 is installed in the vehicle, even if the length of the USB cable 200 is 5 m, since the length of the USB cable connecting between the connector 102 and the USB driver 112 and/or the variable power supply 114 is added, 5 m can be substantially exceeded.

In the system, the on-vehicle device 100 detects the length of the USB cable. The length of the USB cable is the length of the USB cable 200 which has one end connected to the connector 102 and another end connected to the USB device 300. The on-vehicle device 100 adds the length of the USB cable connecting between the connector 102 and the USB driver 112 and/or the variable power supply 114 to the detected length of the USB cable 200, and performs control for ensuring communication quality between the on-vehicle device 100 and the USB device 300 based on the sum of these lengths. In the embodiment, as the control for ensuring communication quality between the on-vehicle device 100 and the USB device 300, examples of controlling the amplification factor of a signal transmitted by the communication line 206 and/or the power supply voltage supplied to the power line 208 are explained. However, the amplification factor of a signal transmitted by the communication line 206 and/or the power supply voltage supplied to the power line 208 are merely examples, and controlling any parameters which can be controlled for ensuring communication quality between the on-vehicle device 100 and the USB device 300 is possible.

[On-Vehicle Device]

The on-vehicle device 100 will be described.

The connector 102 is connected to the USB cable 200. For example, the connector 102 may be a female connector of the USB A-type terminal. The connector 102 has 5 pins (PIN). The pins include a pin connected to the power supply line 208, two pins connected to the communication line 206, a pin connected to the cable length detection line 204 and a pin connected to ground (not shown).

The power supply 104 applies a voltage. The power supply 104 is connected to an anode side of the diode 108 via the resistance 106, and a cathode side of the diode 108 is connected to the connector 102. If the connector 102 is connected to the connector 202 of the USB cable 200, the cathode side of the diode 108 is connected to the cable length detection line 204.

The microcomputer 110 is connected to the anode side of the diode 108. The microcomputer 110 measures the voltage on the anode side of the diode 108. In other words, the microcomputer 110 measures the voltage applied to the cable length detection line 204 and the resistance 212. The microcomputer 110 determines the length of the USB cable based on the measured voltage.

Figure 2:
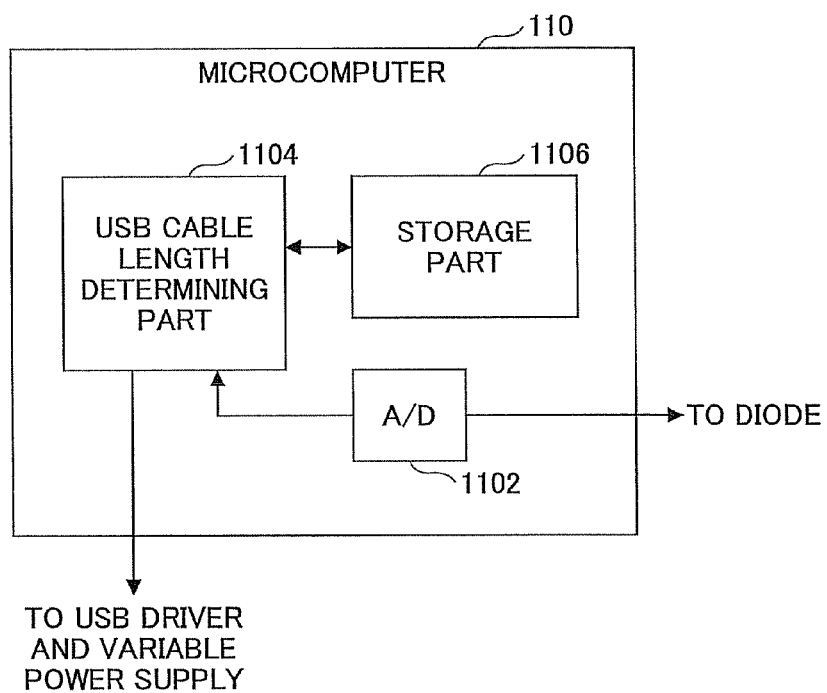
FIG. 2 is a functional block diagram for illustrating a microcomputer of the on-vehicle device according to an embodiment.

FIG. 2 is a functional block diagram for illustrating an example of the microcomputer 110 of the on-vehicle device 100.

The microcomputer 110 includes an analog/digital converter (A/D) 1102, a USB cable length determining part 1104 and a storage part 1106.

The A/D 1102 is connected to the anode side of the diode 108. The A/D 1102 converts the voltage values on the anode side of the diode 108 to digital values. The A/D 1102 inputs the digitized values of the voltage values on the anode side of the diode 108 to the USB cable length determining part 1104.

The power supply applies a voltage via the resistance 106. The resistance 212 whose one end is connected to the ground is connected to the cathode side of the diode 108 via the cable length detection line 204 when the on-vehicle device 100 is connected to the USB cable 200. Resistance value of the resistance 212 is set according to the cable length of the USB cable 200. When the on-vehicle device 100 and the USB cable 200 are connected, a potential on the anode side of the diode 108 varies with the resistance value of the resistance 212. Thus, by preparing a table in which the resistance value of the resistance 212 and the potential (i.e., the voltage value) on the anode side of the diode 108 are associated with each other, it becomes possible to determine the resistance value of the resistance 212 based on the potential on the anode side of the diode 108. Since the resistance value of the resistance 212 can be determined, the cable length of the USB cable 200 which is associated with the resistance value of the resistance 212 can be determined.

The storage part 1106 stores the table in which the resistance value of the resistance 212 and the potential on the anode side of the diode 108 are associated with each other, and a table in which the resistance value of the resistance 212 and the cable length of the USB cable 200 are associated with each other. The tables may be unified as one table. If the tables are unified as one table, a table in which the potential on the anode side of the diode 108 and the cable length of the USB cable 200 are associated with each other is stored.

The USB cable length determining part 1104 refers to the table in the storage part 1106 to determine the resistance value of the resistance 212 associated with the potential on the anode side of the diode 108 input from the A/D 1102. Then, the USB cable length determining part 1104 determines the cable length of the USB cable 200 associated with the resistance value of the resistance 212. The USB cable length determining part 1104 inputs the determined cable length of the USB cable 200 to the USB driver 112 and the variable power supply 114.

The USB driver 112 controls the amplification factor of the signal supplied to the USB cable 200. According to the specifications of USB2.0, half-duplex transmission is applied as a communication mode. According to the half-duplex transmission, it is not possible to transmit data simultaneously from both sides or receive data simultaneously at both sides in bidirectional communication, and only the transmission from one side by time division is possible.

Figure 3:
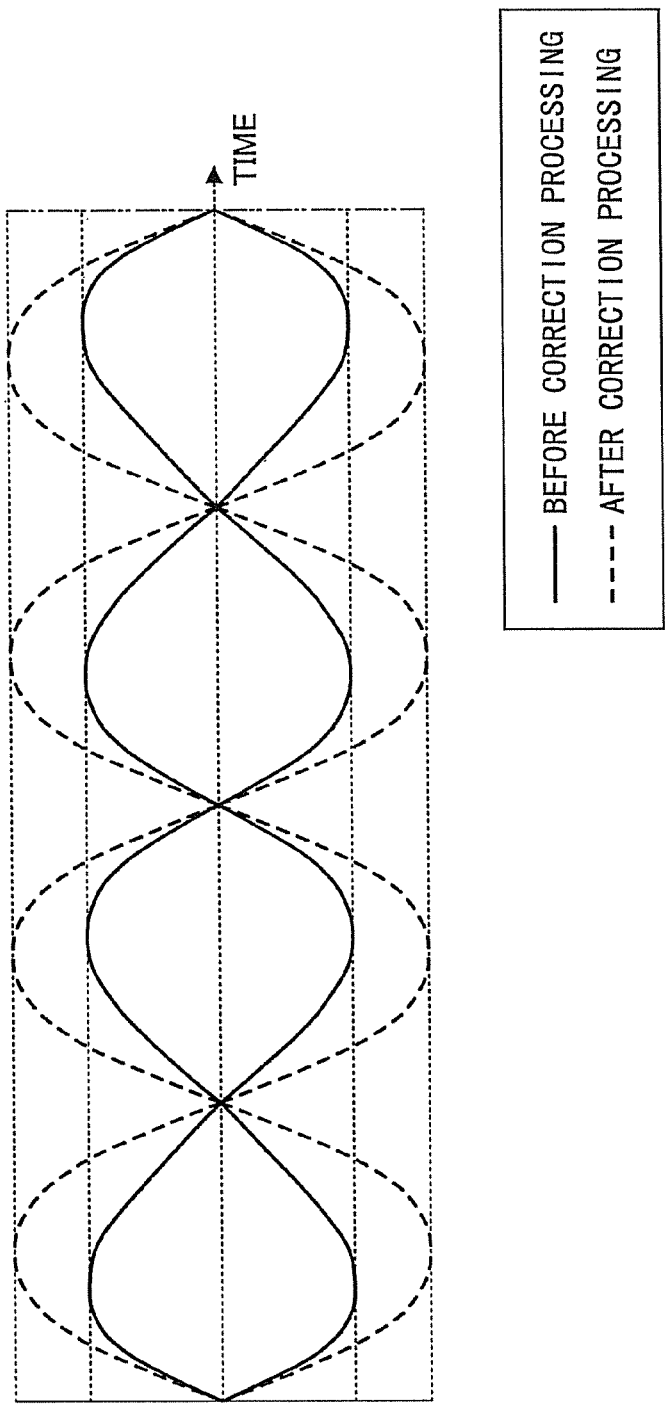
FIG. 3 is a diagram used for explaining control of an amplification factor of a transmission signal in the on-vehicle device according to an embodiment.

FIG. 3 is a diagram for illustrating a signal waveform of the data transmitted by the on-vehicle device 100. In FIG. 3, a solid line indicates the signal waveform before correction processing. In other words, the solid line indicates the signal waveform before the amplification factor is controlled in the on-vehicle device 100. In FIG. 3, a dashed line indicates the signal waveform after the correction processing. In other words, the dashed line indicates the signal waveform after the amplification factor is controlled in the on-vehicle device 100. The signal waveforms are ones which are detected in the USB connector 210.

The USB driver 112 estimates attenuation amount of the transmission signal generated in the communication line 206 of the USB cable 200 based on the cable length of the USB cable 200 input from the microcomputer 110. The USB driver 112 also considers the length of the USB cable connecting between the connector 102 and the USB driver 112 and/or the variable power supply 114 in estimating the attenuation amount of the transmission signal generated in the communication line 206 of the USB cable 200. The USB driver 112 amplifies the signal in transmitting the data so as to compensate for the attenuation. A table in which the cable length and the amplification factor for the transmission signal are associated with each other may be prepared. The USB driver 112 amplifies the signal such that it has amplitude specified by the specifications in the USB connector 210 of the USB cable 200 connected to the on-vehicle device 100. For example, the USB driver 112 amplifies the signal such that it has a waveform shown by the dashed line, if the waveform such as shown by the solid line is anticipated after the attenuation.

Even the transmission signal attenuated in the communication line 206 may have amplitude specified by the specifications in the USB connector 210, depending on materials of the USB cable 200. If it is estimated that the amplitude specified by the specifications is implemented in the USB connector 210, the USB driver 112 may not perform the amplification for compensating for the attenuation. It is possible to reduce power consumption by performing the amplification as necessary.

The variable power supply 114 controls the voltage supplied to the power supply line 208 of the USB cable 200. According to the specifications of USB2.0, the voltage supplied to the USB device 300 is specified as 5.0±0.25 V. The variable power supply 114 estimates a voltage drop not only in the power supply line 208 but also in the USB connector 210 and the USB cable connecting the connector 102 and the USB driver 112 and/or the variable power supply 114. The variable power supply 114 increases the voltage value for compensating for the voltage drop. A table in which the cable length and the voltage value of the power supply are associated with each other may be prepared. The variable power supply 114 increases the supply voltage to the voltage specified by the specifications in the USB connector 210 of the USB cable 200 connected to the on-vehicle device 100. The variable power supply 114 may perform the boosting with a DC-CD converter, etc., or perform the boosting with a regulator. Any type of the power supply may be used as long as it can vary the power supply voltage.

Even the dropped voltage in the power supply line 208 may have the voltage specified by the specifications in the USB connector 210, depending on materials of the USB cable 200. If it is estimated that the amplitude specified by the specifications is implemented in the USB connector 210, the USB driver 114 may not perform the amplification for compensating for the attenuation. It is possible to reduce power consumption by performing the control of the power supply voltage as necessary.

Figure 4:
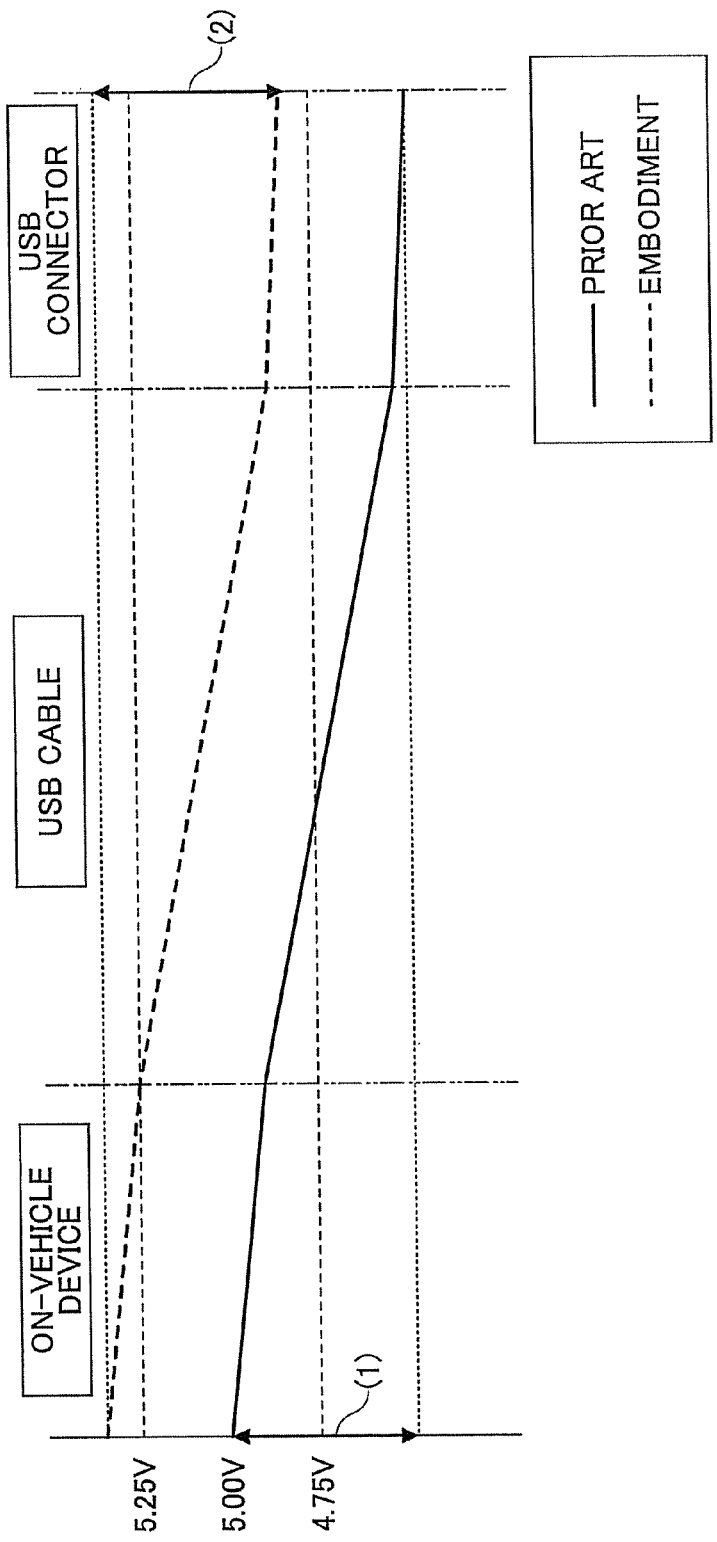
FIG. 4 is a diagram used for explaining control of a power supply voltage supplied to a power supply line in the on-vehicle device according to an embodiment.

FIG. 4 shows an example of setting the power supply voltage in the on-vehicle device. In FIG. 4, a solid line indicates the voltage supplied to the voltage line in a conventional configuration, and an example in which the voltage in the USB connector 210 no longer meets the specifications due to the voltage drop. In FIG. 4, a dashed line indicates the voltage supplied to the voltage line in the embodiment, and an example in which the voltage in the USB connector 210, which even though decreased due to the voltage drop, meets the specifications.

In the conventional configuration, the power supply voltage supplied to the power supply cable in the on-vehicle device 100 set to 5 V, as indicated by the solid line in FIG. 4. The power supply voltage set to 5 V does not meet 5.0±0.25 V of the USB specifications at the location in the USB connector 210 due to the voltage drop (indicated by (1) in FIG. 4). The power supply voltage drops below 4.75 V (=5.0V-0.25V).

On the other hand, as shown by the dashed line, according to the embodiment, since the power supply voltage is controlled based on the length of the power supply line 208 and the USB cable connecting between the connector 102 and the USB driver 112 and/or the variable power supply 114 such that it meets the specifications in the USB connector 210, it meets 5.0±0.25 V of the USB specifications at the location in the USB connector 210 even though there is a voltage drop (indicated by (2) in FIG. 4). The power supply voltage supplied in the on-vehicle device 100 may exceed 5.25V (=5.0+0.25 V).

[USB Cable]

The USB cable 200 is described.

The connector 202 is connected to the on-vehicle device 100. For example, the connector 202 may be a male connector of the USB A-type terminal. The connector 202 has 5 pins (PIN) as is the case with the connector 102. The pins include a pin connected to the power supply line 208, two pins connected to the communication line 206, a pin connected to the cable length detection line 204 and a pin connected to ground (not shown).

The cable length detection line 204 is an electric cable used for the detection of the cable length of the USB cable 200 by the on-vehicle device 100. The resistance 212 is connected to the end of the cable length detection line 204 on the side which is opposite to the side of the connector 202. Preferably, the material of the cable length detection line 204 has such a property that the variation in the resistance value is small even if the length of the cable length detection line 204 changes. By forming the cable length detection line 204 with the material with such a property that the variation in the resistance value is small, it is possible to reduce the voltage applied to the cable length detection line 204. Since the voltage applied to the cable length detection line 204 can be lower, it is possible to reduce a detection error of the voltage applied to the resistance 212. Since it is possible to reduce a detection error of the voltage applied to the resistance 212, it is possible to reduce a detection error of the cable length determined based on the detected voltage applied to the resistance 212. When the USB cable 200 is connected to the on-vehicle device 100, the voltage is applied to the resistance 106 and the resistance 212 by the power supply 104. The microcomputer 110 detects the voltage applied to the resistance 212 to detect the length of the USB cable 200.

The communication line 206 is a signal transmission line used for transmitting the signal. The communication line 206 includes differential data pair lines (D+, D−).

The power supply line 208 is an electric cable for supplying the voltage to the USB device 300.

The USB connector 210 is connected to the USB device 300. For example, the USB connector 210 may be a female connector of the USB A-type terminal. The USB connector 212 has 4 pins (PIN). The pins include a pin connected to the power supply line 208, two pins connected to the communication line 206 and a pin connected to ground (not shown).

The resistance 212 is configured to have a resistance value associated with the length of the cable length detection line 204. The resistance 212 is formed such that it is integrated with the USB connector 210.

The USB device 300 may be any type of the device as long as it is a USB-connected device. For example, USB device 300 may be a portable digital music player, a USB memory, a USB-connected hard disk (HD), etc.

[Operations of the System]

Figure 5:
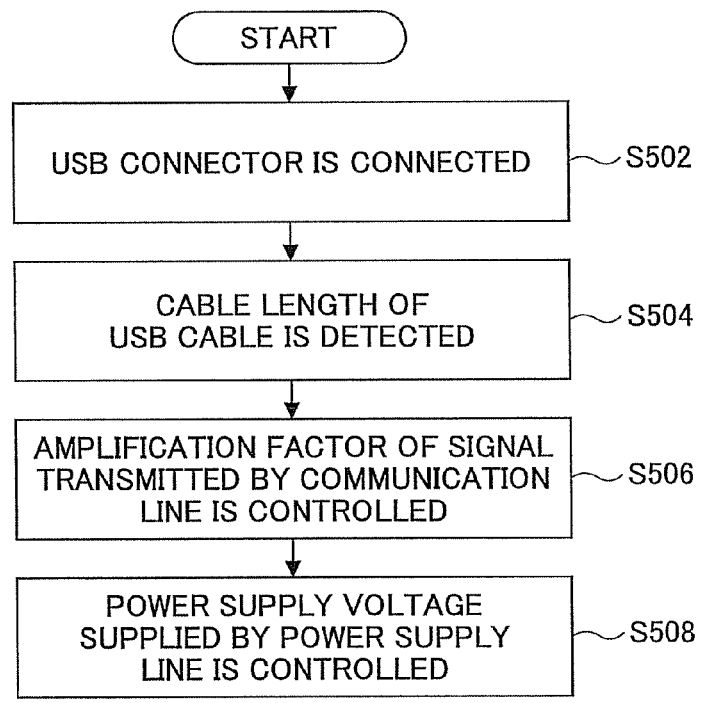
FIG. 5 is a flowchart for illustrating operations of the on-vehicle device according to an embodiment.

FIG. 5 shows operations of the system. In FIG. 5, operations of the USB control apparatus installed in the on-vehicle device 100 are mainly described.

The on-vehicle device 100 and the USB cable 200 are connected to each other (step S502). The connector 102 of the on-vehicle device 100 and the connector 202 of the USB cable 200 are connected to each other.

The on-vehicle device 100 detects the cable length of the USB cable 200 connected to the on-vehicle device 100 (step S504). When the USB cable 200 is connected to the on-vehicle device 100, the power supply 104 applies the voltage to the resistance 106 and the resistance 212. The A/D 1102 converts a voltage value on the anode side of the diode 108 to a digital value. In the USB cable length determining part 1104, the cable length of the USB cable 200 associated to the voltage value is obtained.

The on-vehicle device 100 controls the amplification factor of the signal to be transmitted via the communication line 206 (step S506). The USB driver 112 determines, based on the cable length detected by step S504, the cable length to which the length of the USB cable connecting between the connector 102 and the USB driver 112 and/or the variable power supply 114 is added. Then, the USB driver 112 estimates the attenuation amount of the transmission signal based on the sum of the cable lengths. The USB driver 112 determines the amplification factor necessary to compensate for the attenuation amount. The USB driver 112 controls, according to the determined amplification factor, the amplification factor of the signal transmitted via the communication line 206 as required.

The on-vehicle device 100 controls the power supply voltage supplied via the power supply line 208 (step S508). The variable power supply 114 determines, based on the cable length detected by step S504, the cable length to which the length of the USB cable connecting between the connector 102 and the USB driver 112 and/or the variable power supply 114 is added. Then, the USB driver 112 estimates the voltage drop based on the sum of the cable lengths. The variable power supply 114 determines the voltage value necessary to compensate for the estimated voltage drop. The variable power supply 114 controls the power supply voltage supplied via the power supply line 208 according to the determined voltage value.

After the process of the step S508 is completed, the power supply voltage is supplied from the on-vehicle device 100 to the USB device 300, and the transmission and reception of the data are performed between the on-vehicle device 100 and the USB device 300.

In the operation flow, the sequence of the processes of step S506 and step S508 may be reversed or these processes may be performed simultaneously.

In step S506, the USB driver 112 may set the amplification factor by referring to the table which indicates the relationship between the cable length and the amplification factor.

In step S508, the variable power supply 114 may set the power supply voltage by referring to the table which indicates the relationship between the cable length and the voltage value.

It is anticipated that the transmission property of the USB cable varies with manufacturing companies of the USB cable. For example, it is anticipated that the resistance value of the resistance 212 which is associated with the length of the USB cable varies with the manufacturing companies. If the resistance value of the resistance 212 is different on a manufacturing company basis, the resistance 212 may be formed of plural resistance elements in order to identify the manufacturing company. In this case, the manufacturing companies may be made distinguishable by the ways of combining the resistance elements. For example, there may be a first resistance element for detecting the cable length and a second resistance element for identifying the respective manufacturing companies. The first and second resistance elements may be connected in parallel. In the case where the manufacturing companies are made distinguishable, the storage part 1106 stores, on a manufacturing company basis, the table in which the resistance value of the resistance 212 and the potential on the anode side of the diode 108 are associated with each other, and the table in which the resistance value of the resistance 212 and the cable length of the USB cable 200 are associated with each other. The tables may be unified as one table. If the tables are unified as one table, a table in which the potential on the anode side of the diode 108 and the cable length of the USB cable 200 are associated with each other is stored. Further, it is anticipated that the transmission property of the USB cable varies with a material of the USB cable 200. The cable length of the USB cable 200 may be set on a material basis.

In the embodiment described above, the power supply voltage and/or the amplification factor may be set in the microcomputer 110.

According to the embodiment, even if the length of the USB cable exceeds the length specified by the specifications, it is possible to control the power supply voltage supplied to the power supply line 208 as necessary, in order to compensate for the voltage drop in the USB cable. Since it is possible to control the power supply voltage such that the voltage drop in the USB cable is compensated for, it is possible to improve the communication quality between the on-vehicle device 100 and the USB device 300.

According to the embodiment, even if the length of the USB cable exceeds the length specified by the specifications, it is possible to control the amplification factor of the transmission signal as necessary, in order to compensate for the attenuation in the communication line of the USB cable. Since it is possible to control the power supply voltage such that the attenuation of the transmission signal in the communication line of the USB cable is compensated for, it is possible to improve the communication quality between the on-vehicle device and the USB device.

According to the embodiment, since the cable length detection line 204 and the resistance 212 are associated with each other, the cable length can be variable. The cable length can be recognized by the on-vehicle device 100.

[Variation]
[System]

Figure 6:
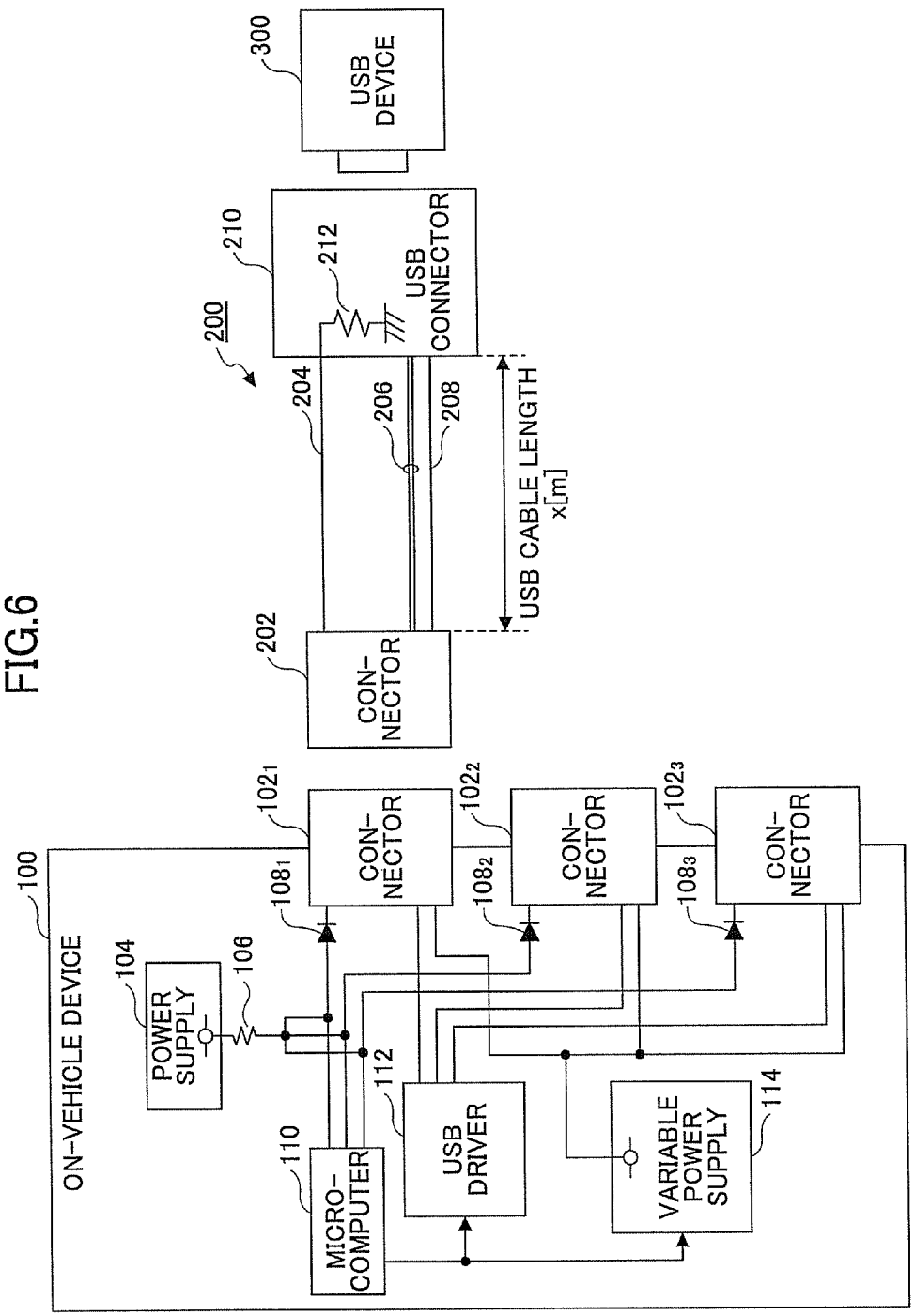
FIG. 6 is a block diagram for illustrating a system to which an on-vehicle device, a USB cable and a USB device according to an embodiment are applied.

FIG. 6 is a functional block diagram for illustrating a system to which an on-vehicle device, a USB cable and a USB device according to an embodiment are applied.

The system includes an on-vehicle device 100, a USB cable 200 and a USB device 300.

The on-vehicle device 100 differs from the on-vehicle device according to the first embodiment in that it includes plural connectors. In FIG. 6, as an example, three connectors $102_1$, $102_2$ and $102_3$ are shown. The number of the connectors 102 may be 2 or more than or equal to 4.

In FIG. 6, one USB cable 200 is illustrated; however, the number of the USB cables 200 may be 2 or 3. The number of the USB cables 200 which can be used is less than or equal to the number of the connectors 102 of the on-vehicle device 100. The USB cables 200 are connected to the corresponding USB devices 300.

The on-vehicle device 100 performs the control by switching the connectors 102 in sequence. The on-vehicle device 100 controls in sequence the amplification factors of the signals transmitted via the communication lines 206 and/or the power supply voltages supplied to the power supply lines 208 of the USB cables 200 connected to the corresponding connectors $102_1$, $102_2$ and $102_3$. For example, the USB cable 200 connected to the connector $102_1$ may be used for the driver seat, the USB cable 200 connected to the connector $102_2$ may be used for the passenger seat and the USB cable 200 connected to the connector $102_3$ may be used for the rear seats. For example, the USB device 300 of the driver is connected to the USB connector 210 of the USB cable 200 for the driver seat, the USB device 300 of the passenger is connected to the USB connector 210 of the USB cable 200 for the passenger seat, and the USB device 300 of the person seated in the rear seat is connected to the USB connector 210 of the USB cable 200 for the rear seats.

The distances to the driver seat, the passenger seat and the rear seat from the location of the on-vehicle device 100 are different, and thus the lengths of the USB cables 200 connected to the corresponding connectors $102_1$, $102_2$ and $102_3$ are different.

The microcomputer 110 detects the lengths of the respective USB cables 200 in sequence, using the detection way described in connection with the first embodiment. The microcomputer 110 detects the lengths of the respective USB cables 200 connected to the corresponding connectors by measuring the potentials on the anode sides of the diodes 108 ($108_1$, $108_2$ and $108_3$) connected to the connectors 102 ($102_1$, $102_2$ and $102_3$) which in turn are connected to the USB cables 200. If the USB cables 200 are connected to the on-vehicle device 100 simultaneously, the respective potentials on the anode sides of the diodes connected to the connector 102 ($102_1$, $102_2$ and $102_3$) are measured by performing the switching in a predetermined sequence. The microcomputer 110 inputs information indicating the detected lengths of the USB cables 200 to the USB driver 112 and the variable power supply 114.

The USB driver 112 controls the amplification factors of the signals supplied to the USB cables 200 connected to the corresponding connectors 102 ($102_1$, $102_2$ and $102_3$) by performing the switching in a predetermined sequence.

The variable power supply 114 controls the power supply voltages supplied to the USB cables 200 connected to the corresponding connectors 102 ($102_1$, $102_2$ and $102_3$) by performing the switching in a predetermined sequence.

According to the variant, it is possible to perform the communication between the USB devices 300.

According to the embodiment, even if the lengths of the USB cables are different and exceed the length specified by the specifications, it is possible to control the power supply voltages supplied to the power supply lines 208 as necessary, in order to compensate for the voltage drops in the USB cables. Since it is possible to control the power supply voltages such that the voltage drops in the USB cables are compensated for, it is possible to improve the communication quality between the on-vehicle device 100 and the USB devices 300.

According to the variant, even if the lengths of the USB cables are different and exceed the length specified by the specifications, it is possible to control the amplification factors of the transmission signals as necessary, in order to compensate for the attenuation in the communication lines of the USB cables. Since it is possible to control the power supply voltages such that the attenuation of the transmission signals in the communication lines of the USB cables are compensated for, it is possible to improve the communication quality between the on-vehicle device 100 and the USB devices 300.

According to the variant, since the cable length detection line 204 and the resistance 212 are associated with each other, the cable length can be variable. The cable length can be recognized by the on-vehicle device 100.

Second Embodiment

System

Figure 7:
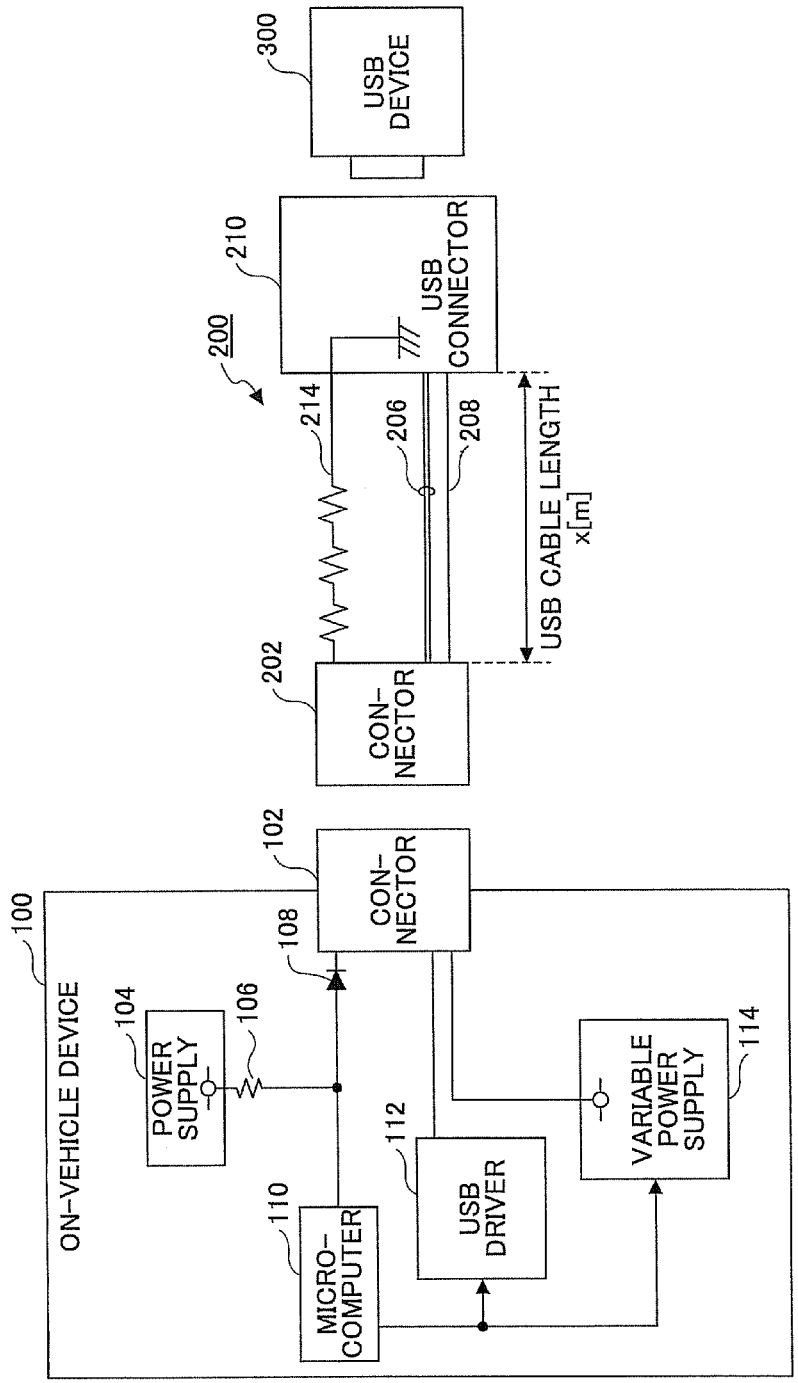
FIG. 7 is a block diagram for illustrating a system to which an on-vehicle device, a USB cable and a USB device according to an embodiment are applied.

FIG. 7 is a functional block diagram for illustrating a system to which an on-vehicle device, a USB cable and a USB device according to an embodiment are applied.

The system is similar to the system described in connection with the first embodiment but differs from it in that the USB cable 200 includes a cable length detection resistance line 214 instead of the cable length detection line 204 and the resistance 212.

The cable length detection resistance line 214 is a resistance wire used for the detection of the cable length of the USB cable 200 by the on-vehicle device 100. The cable length detection resistance line 214 has a resistance value associated with the length of the cable length detection resistance line 214. Preferably, the material of the cable length detection resistance line 214 has such a property that the resistance value varies with the length of the cable length detection resistance line 214. By forming the cable length detection resistance line 214 with the material of such a property that the resistance value varies with the length thereof, it is possible to detect the length of the cable length detection resistance line 214 based on the voltage applied to the cable length detection resistance line 214 by the power supply 104. When the USB cable 200 is connected to the on-vehicle device 100, the voltage is applied to the resistance 106 and the cable length detection resistance line 214 by the power supply 104. The microcomputer 110 detects the voltage applied to the cable length detection resistance line 214 to detect the length of the USB cable 200. By preparing for the USB cable 200 including the cable length detection resistance line 214 whose resistance value is associated with the length of the cable length detection resistance line 214, it is possible to detect the cable length in the on-vehicle device 100 without having the resistance incorporated in the USB connector 210.

The on-vehicle device 100 and the USB device 300 are the same as those described above in connection with the first embodiment, and thus the explanations thereof are omitted.

[Operations of the System]

The operations of the system differ from the first embodiment described above in the process of step S504 in the operations shown in FIG. 5.

In step S504, the on-vehicle device 100 detects the cable length of the USB cable 200 connected to the on-vehicle device 100. When the USB cable 200 is connected to the on-vehicle device 100, the power supply 104 applies the voltage to the resistance 106 and the cable length detection resistance line 214. The A/D 1102 converts a voltage value on the anode side of the diode 108 to a digital value. In the USB cable length determining part 114, the cable length of the USB cable 200 associated with the voltage value is obtained.

According to the embodiment, even if the length of the USB cable exceeds the length specified by the specifications, it is possible to control the power supply voltage supplied to the power supply line 208 as necessary, in order to compensate for the voltage drop in the USB cable. Since it is possible to control the power supply voltage such that the voltage drop in the USB cable is compensated for, it is possible to improve the communication quality between the on-vehicle device 100 and the USB device 300.

According to the embodiment, even if the length of the USB cable exceeds the length specified by the specifications, it is possible to control the amplification factor of the transmission signal as necessary, in order to compensate for the attenuation in the communication line 206 of the USB cable. Since it is possible to control the power supply voltage such that the attenuation of the transmission signal in the communication line of the USB cable is compensated for, it is possible to improve the communication quality between the on-vehicle device 100 and the USB device 300.

According to the embodiment, since the resistance value of the cable length detection resistance line 214 and the cable length are associated with each other, the cable length can be variable. The cable length can be recognized by the on-vehicle device 100.

According to the embodiment, since it is possible to detect the cable length based on the resistance value of the cable length detection resistance line 214, it is not necessary to have the resistance incorporated in the USB connector 210.

[Variation]

[System]

Figure 8:
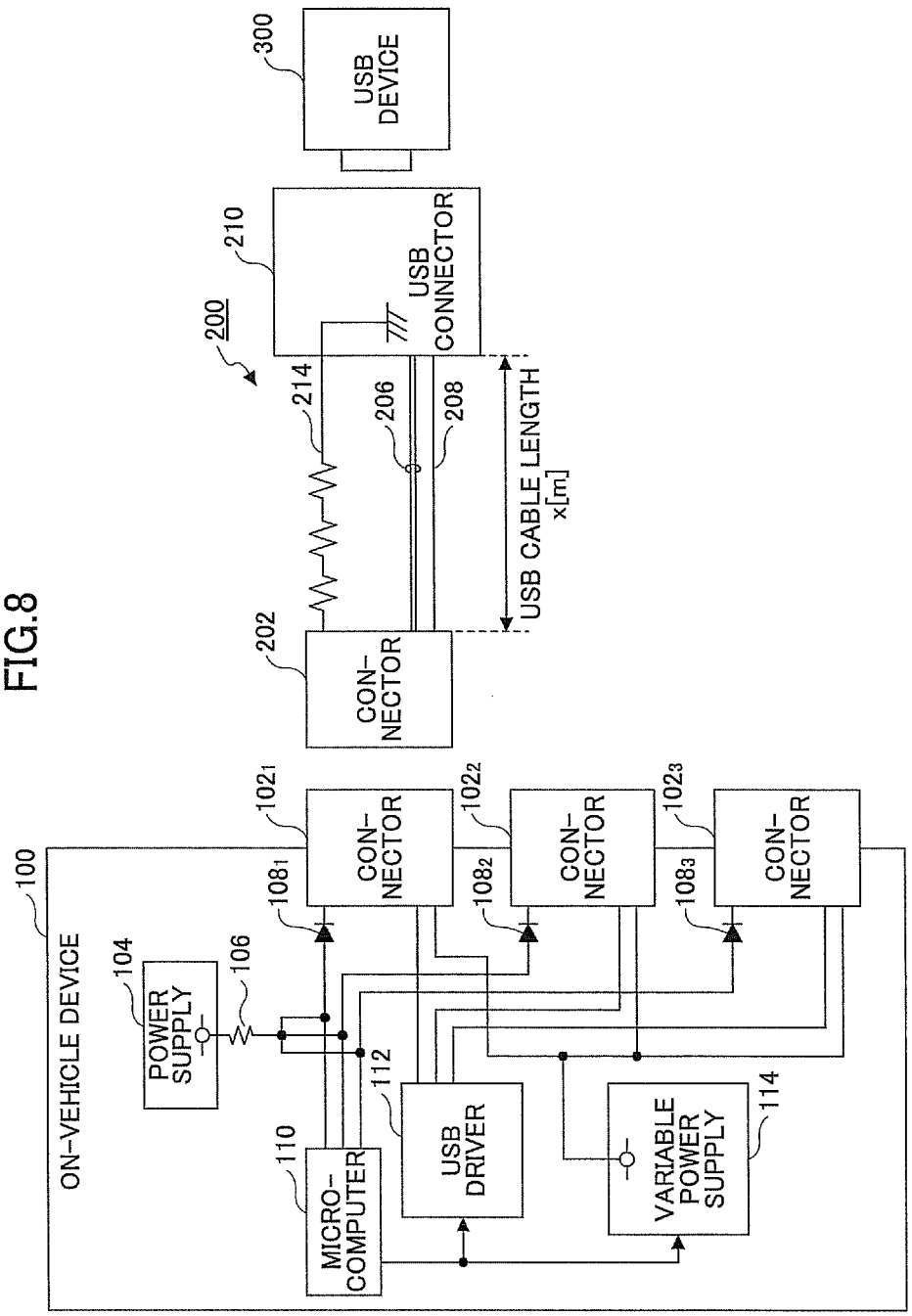
FIG. 8 is a block diagram for illustrating a system to which an on-vehicle device, a USB cable and a USB device according to an embodiment are applied.

FIG. 8 is a functional block diagram for illustrating a system to which an on-vehicle device, a USB cable and a USB device according to an embodiment are applied.

The system includes an on-vehicle device 100, a USB cable 200 and a USB device 300.

The on-vehicle device 100 differs from the on-vehicle device according to the second embodiment in that it includes plural connectors. In FIG. 8, as an example, three connectors $102_1$, $102_2$ and $102_3$ are shown. The number of the connectors may be 2 or greater than or equal to 4.

In FIG. 8, one USB cable 200 is illustrated; however, the number of the USB cables may be 2 or 3. The number of the USB cables 200 which can be used is less than or equal to the number of the connectors of the on-vehicle device 100. The USB cables 200 are connected to the corresponding USB devices 300.

The USB cables 200 differ from the USB cables 200 according to the variant of the first embodiment in that they have the cable length detection resistance lines 214 instead of the cable length detection lines 204 and the resistances 212.

The cable length detection resistance line 214 is a resistance wire used for the detection of the cable length of the USB cable 200 by the on-vehicle device 100. The cable length detection resistance line 214 has a resistance value associated with the length of the cable length detection resistance line 214. Preferably, the material of the cable length detection resistance line 214 has such a property that the resistance value varies with the length of the cable length detection resistance line 214. By forming the cable length detection resistance line 214 with the material having such a property that the resistance value varies with the length thereof, it is possible to detect the length of the cable length detection resistance line 214 based on the voltage applied to the cable length detection resistance line 214 by the power supply 104. When the USB cable 200 is connected to the on-vehicle device 100, the voltage is applied to the resistance 106 and the cable length detection resistance line 214 by the power supply 104. The microcomputer 110 detects the voltage applied to the cable length detection resistance line 214 to detect the length of the USB cable 200.

By preparing for the USB cable 200 including the cable length detection resistance line 214 whose resistance value is associated with the length thereof, it is possible to detect the cable length in the on-vehicle device 100 without having the resistance incorporated in the USB connector 210.

The on-vehicle device 100 and the USB device 300 are the same as those described above in connection with the variant of the first embodiment, and thus the explanations thereof are omitted.

According to the variant, it is possible to perform the data transmissions between the USB devices 300.

According to the embodiment, even if the lengths of the USB cables are different and exceed the length specified by the specifications, it is possible to control the power supply voltages supplied to the power supply lines 208 as necessary, in order to compensate for the voltage drops in the USB cables. Since it is possible to control the power supply voltages such that the voltage drops in the USB cables are compensated for, it is possible to improve the communication quality between the on-vehicle device 100 and the USB devices 300.

According to the variant, even if the lengths of the USB cables are different and exceed the length specified by the specifications, it is possible to control the amplification factors of the transmission signals as necessary, in order to compensate for the attenuation in the communication lines 206 of the USB cables. Since it is possible to control the power supply voltages such that the attenuation of the transmission signals in the communication lines 206 of the USB cables are compensated for, it is possible to improve the communication quality between the on-vehicle device 100 and the USB devices 300.

According to the embodiment, since the resistance value of the cable length detection resistance line 214 and the cable length are associated with each other, the cable length can be variable. The cable length can be recognized by the on-vehicle device 100.

According to the variant, since it is possible to detect the cable length based on the resistance value of the cable length detection resistance line 214 including the resistance, it is not necessary to have the resistance incorporated in the USB connector 210.

Third Embodiment

System

Figure 9:
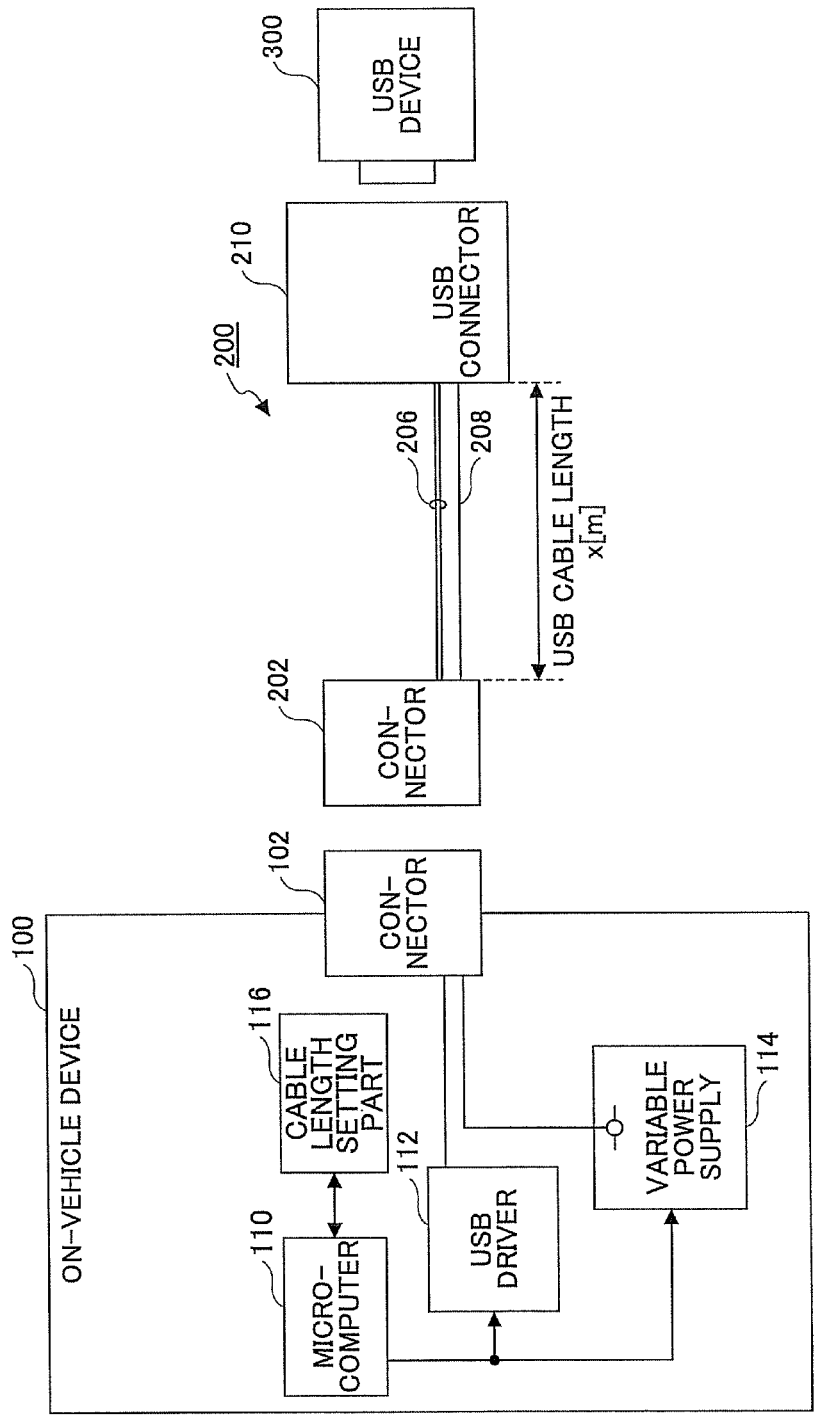
FIG. 9 is a block diagram for illustrating a system to which an on-vehicle device, a USB cable and a USB device according to an embodiment are applied.

FIG. 9 is a functional block diagram for illustrating a system to which an on-vehicle device, a USB cable and a USB device according to an embodiment are applied.

The system differs from the systems described in connection with the first and second embodiments in the configurations of the on-vehicle device 100 and the USB cable 200.

In the system, the cable length of the USB cable 200 connected to the on-vehicle device 100 is limited to predetermined lengths. The setting of the cable length of the USB cable 200 can be changed. Since the cable length of the USB cable 200 can be set, a line for detecting the cable length of the USB cable 200 may become unnecessary.

The on-vehicle device 100 differs from the on-vehicle device according to the first embodiment in that it includes a cable length setting part 116 instead of the power supply 104, the resistance 106 and the diode 108.

The cable length setting part 116 is connected to the microcomputer 110 and configured to set the cable length of the USB cable 200 to be connected to the on-vehicle device 100. It may be set by a user. The microcomputer 110 inputs the cable length set by the cable length setting part 116 to the USB driver 112 and the variable power supply 114. The processing in the USB driver 112 and the variable power supply 114 is the same as that in the embodiment described above, and thus explanation thereof is omitted.

[Operations of the System]

Figure 10:
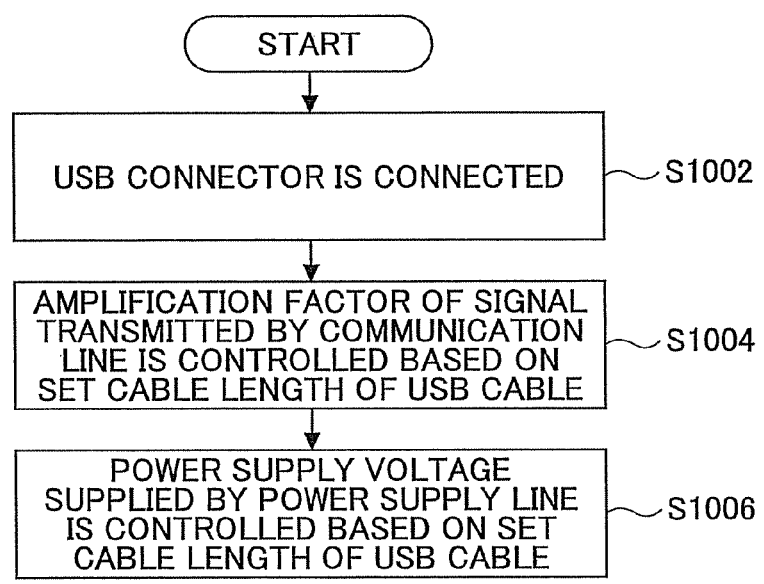
FIG. 10 is a flowchart for illustrating operations of the on-vehicle device according to an embodiment.

FIG. 10 shows operations of the system.

The on-vehicle device 100 and the USB cable 200 are connected to each other (step S1002). The connector 102 of the on-vehicle device 100 and the connector 202 of the USB cable 200 are connected to each other.

The on-vehicle device 100 controls, based on the cable length of the USB cable set in the on-vehicle device 100, the amplification factor of the signal transmitted by the communication line 206 (step S1004). The microcomputer 110 inputs the cable length set by the cable length setting part 116 to the USB driver 112 and the variable power supply 114. The USB driver 112 determines, based on the cable length of the USB cable input by the microcomputer 110, the cable length to which the length of the USB cable connecting between the connector 102 and the USB driver 112 and/or the variable power supply 114 is added. Then, the USB driver 112 estimates the attenuation amount of the transmission signal based on the sum of the cable lengths. The USB driver 112 determines the amplification factor necessary to compensate for the attenuation amount. The USB driver 112 controls, according to the determined amplification factor, the amplification factor of the signal transmitted via the communication line 206 as required.

The on-vehicle device 100 controls, based on the cable length of the USB cable set in the on-vehicle device 100, the power supply voltage supplied by the power supply line 208 (step S1006). The variable power supply 114 determines, based on the cable length of the USB cable input by the microcomputer 110, the cable length to which the length of the USB cable connecting between the connector 102 and the USB driver 112 and/or the variable power supply 114 is added. Then, the USB driver 112 estimates the voltage drop based on the sum of the cable lengths. The variable power supply 114 determines the voltage value necessary to compensate for the estimated voltage drop. The variable power supply 114 controls the power supply voltage supplied via the power supply line 208 according to the determined voltage value.

After the process of step S1006 is completed, the power supply voltage is supplied from the on-vehicle device 100 to the USB device 300, and the transmission and reception of the data are performed between the on-vehicle device 100 and the USB device 300.

In the operation flow, the sequence of the processes of step S1004 and step S1006 may be reversed or these processes may be performed simultaneously.

In step S1004, the USB driver 112 may set the amplification factor by referring to the table which indicates the relationship between the cable length and the amplification factor.

In step S1006, the variable power supply 114 may set the power supply voltage by referring to the table which indicates the relationship between the cable length and the voltage value.

It is anticipated that the transmission property of the USB cable varies with manufacturing companies of the USB cable. The cable length of the USB cable 200 may be set on a manufacturing company basis. Further, it is imagined that the transmission property of the USB cable varies with a material of the USB cable. The cable length of the USB cable 200 may be set on a material basis.

According to the embodiment, even if the length of the USB cable exceeds the length specified by the specifications, it is possible to control the power supply voltage supplied to the power supply line 208 as necessary, in order to compensate for the voltage drop in the USB cable. Since it is possible to control the power supply voltage such that the voltage drop in the USB cable is compensated for, it is possible to improve the communication quality between the on-vehicle device 100 and the USB device 300.

According to the embodiment, even if the length of the USB cable exceeds the length specified by the specifications, it is possible to control the amplification factor of the transmission signal as necessary, in order to compensate for the attenuation in the communication line 206 of the USB cable. Since it is possible to control the power supply voltage such that the attenuation of the transmission signal in the communication line 206 of the USB cable is compensated for, it is possible to improve the communication quality between the on-vehicle device 100 and the USB device 300.

According to the present invention, since the cable length of the USB cable is set, it is not necessary to provide the cable length detection line 204 or the cable length detection resistance line 214 in the USB cable. Since it is not necessary to provide the cable length detection line 204 or the cable length detection resistance line 214 in the USB cable, it is possible to use existing USB cables.

[Variation]
[System]

Figure 11:
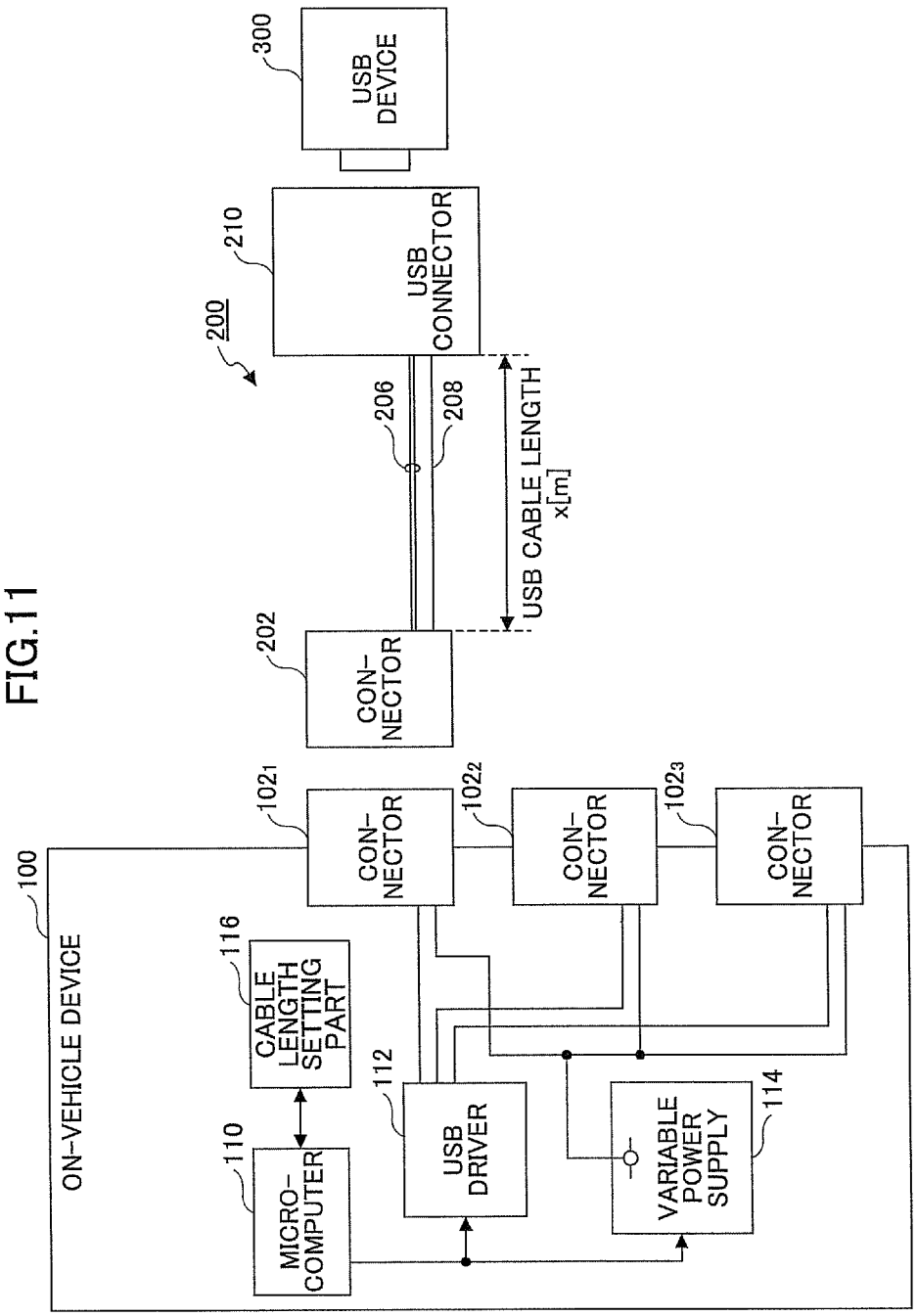
FIG. 11 is a block diagram for illustrating a system to which an on-vehicle device, a USB cable and a USB device according to an embodiment are applied.

FIG. 11 is a functional block diagram for illustrating a system to which an on-vehicle device, a USB cable and a USB device according to an embodiment are applied.

The system includes an on-vehicle device 100, a USB cable 200 and a USB device 300.

The on-vehicle device 100 differs from the on-vehicle device according to the third embodiment in that it includes plural connectors. In FIG. 11, as an example, three connectors $102_1$, $102_2$ and $102_3$ are shown. The number of the connectors may be 2 or greater than or equal to 4.

In FIG. 11, one USB cable 200 is illustrated; however, the number of the USB cables may be 2 or 3. The number of the USB cables 200 which can be used is less than or equal to the number of the connectors of the on-vehicle device 100. The USB cables 200 are connected to the corresponding USB devices 300.

The on-vehicle device 100 differs from the variant of the on-vehicle device according to the first embodiment in that it includes a cable length setting part 116 instead of the power supply 104, the resistance 106 and the diode 108.

The cable length setting part 116 is connected to the microcomputer 110 and configured to set the cable length of the USB cable 200 to be connected to the on-vehicle device 100 on a connector 102 basis. The microcomputer 110 inputs the cable length set by the cable length setting part 116 to the USB driver 112 and the variable power supply 114 on a connector 102 basis. The processing in the USB driver 112 and the variable power supply 114 is the same as that in the third embodiment described above, and thus explanation thereof is omitted.

According to the variant, it is possible to perform the data transmissions between the USB devices 300.

According to the embodiment, even if the lengths of the USB cables are different and exceed the length specified by the specifications, it is possible to control the power supply voltages supplied to the power supply lines 208 as necessary, in order to compensate for the voltage drops in the USB cables. Since it is possible to control the power supply voltages such that the voltage drops in the USB cables are compensated for, it is possible to improve the communication quality between the on-vehicle device 100 and the USB devices 300.

According to the variant, even if the lengths of the USB cables are different and exceed the length specified by the specifications, it is possible to control the amplification factors of the transmission signals as necessary, in order to compensate for the attenuation in the communication lines 206 of the USB cables. Since it is possible to control the power supply voltages such that the attenuation of the transmission signals in the communication lines of the USB cables are compensated for, it is possible to improve the communication quality between the on-vehicle device 100 and the USB devices 300.

According to the variant, since the cable length of the USB cable is set, it is not necessary to provide the cable length detection line 204 or the cable length detection resistance line 214 in the USB cable. Since it is not necessary to provide the cable length detection line 204 or the cable length detection resistance line 214 in the USB cable, it is possible to use existing USB cables.

According to the embodiments and the variants thereof, a control apparatus is provided which is configured to control communications between an on-vehicle device and a device coupled to the on-vehicle device via a cable. The control apparatus includes a cable length detecting part as the USB cable length determining part 1104 which is configured to detect a length of the cable; and a communication controlling part as the USB driver 112 and the variable power supply 114 which are configured to perform, based on the length of the cable detected by the cable length detecting part, control for ensuring communication quality between the on-vehicle device and the device.

With the cable length detecting part, it is possible to detect the length of the cable 200 by the on-vehicle device in which the control apparatus is installed. With the communication controlling part, it is possible to ensure the communication quality between the on-vehicle device 100 and the USB device 300. For example, the communication controlling part can compensate for the attenuation of the signals transmitted by the signal line of the cable and/or the voltage drop of the power supply voltage supplied to the power supply line of the cable.

Further, the communication controlling part includes a power supply voltage controlling part as the variable power supply 114 which is configured to control, based on the length of the cable detected by the cable length detecting part, a power supply voltage in a connector connected to the device by changing a power supply voltage applied to a power supply line of the cable.

With the power supply voltage controlling part, it is possible to compensate for the voltage drop of the power supply voltage supplied to the power supply line of the cable.

Further, the communication controlling part includes an amplification factor controlling part configured to control, based on the length of the cable detected by the cable length detecting part, an amplitude in a connector connected to the device by changing an amplification factor of a signal supplied to a communication line of the cable.

With the amplification factor controlling part, it is possible to compensate for the attenuation of the signals transmitted by the signal line of the cable.

Further, the power supply voltage controlling part is configured to control the power supply voltage in the connector connected to the device by changing the power supply voltage applied to the power supply line of the cable if a combined length of the length of the cable detected by the cable length detecting part and a length of a cable inside the control device exceeds a predetermined length which meets a specification.

Further, it is possible to control the power supply voltage, as necessary, by changing the power supply voltage applied to the power supply line of the cable if a combined length of the length of the cable detected by the cable length detecting part and a length of a cable inside the control device exceeds a predetermined length which meets a specification.

Further, the amplification factor controlling part is configured to control the amplitude in the connector connected to the device by changing the amplification factor of the signal supplied to the communication line of the cable if a combined length of the length of the cable detected by the cable length detecting part and a length of a cable inside the control device exceeds a predetermined length which meets a specification.

It is possible to control the amplification factor, as necessary, by changing the amplification factor of the signals supplied to the communication line of the cable if a combined length of the length of the cable detected by the cable length detecting part and a length of a cable inside the control device exceeds a predetermined length which meets a specification.

Further, the cable has a detection line for detecting the length of the cable, and a resistance whose value is associated with the length of the cable, wherein one end of the resistance is coupled to the detection line and another end of the resistance is coupled to ground. The control apparatus includes a power supply configured to apply a voltage to the resistance; a second resistance whose one end is coupled to the power supply and another end is coupled to the detection line; a voltage measuring part configured to measure the voltage applied to the resistance if the voltage is applied by the power supply; and a table which indicates a relationship between a value of the voltage applied to the resistance and the length of the cable. The cable length detecting part is configured to detect the length of the cable by referring to the table to determine the length of the cable which is associated with the voltage applied to the resistance measured by the voltage measuring part.

With this arrangement, it is possible to detect the length of the cable by determining the length of the cable which is associated with the voltage applied to the resistance measured by the voltage measuring part.

Further, the cable has a detection line for detecting the length of the cable, the detection line having a resistance value which is associated with the length of the cable. The control apparatus includes a power supply configured to apply a voltage to the detection line; a second resistance whose one end is coupled to the power supply and another end is coupled to the detection line; a voltage measuring part configured to measure the voltage applied to the detection line if the voltage is applied by the power supply; and a table which indicates a relationship between a value of the voltage applied to the detection line and the length of the cable. The cable length detecting part is configured to detect the length of the cable by referring to the table to determine the length of the cable which corresponds to the voltage applied to the detection line measured by the voltage measuring part.

With this arrangement, it is possible to detect the length of the cable by determining the length of the cable which is associated with the voltage applied to the detection line measured by the voltage measuring part.

According to the embodiments and the variants thereof, a control apparatus is provided which is configured to control communications between an on-vehicle device and a device coupled to the on-vehicle device via a cable. The control apparatus includes a cable length setting part configured to set a length of the cable; and a communication controlling part configured to perform, based on the length of the cable set by the cable length setting part, control for ensuring communication quality between the on-vehicle device and the device.

With the cable length setting part, it is possible to set the length of the cable 200 by the on-vehicle device in which the control apparatus is installed. With the communication controlling part, it is possible to ensure the communication quality between the on-vehicle device and the USB device. For example, the communication controlling part can compensate for the attenuation of the signals transmitted by the signal line of the cable and/or the voltage drop of the power supply voltage supplied to the power supply line of the cable.

Further, the communication controlling part includes a power supply voltage controlling part configured to control, based on the length of the cable set by the cable length setting part, a power supply voltage in a connector connected to the device by changing a power supply voltage applied to a power supply line of the cable.

With the power supply voltage controlling part, it is possible to compensate for the voltage drop of the power supply voltage supplied to the power supply line of the cable.

Further, the communication controlling part includes an amplification factor controlling part configured to control, based on the length of the cable set by the cable length setting part, an amplitude in a connector connected to the device by changing an amplification factor of a signal supplied to a communication line of the cable.

With the amplification factor controlling part, it is possible to compensate for the attenuation of the signals transmitted by the signal line of the USB cable.

According to the embodiments and the variants thereof, an on-vehicle device which includes the control apparatus is provided.

According to the embodiments and the variants thereof, a system is provided which includes an on-vehicle device and a cable whose one end is coupled to the on-vehicle device and another end is coupled to a device. The cable has a detection line for detecting the length of the cable, and a resistance whose value is associated with the length of the cable, wherein one end of the resistance is coupled to the detection line and another end of the resistance is coupled to ground. The on-vehicle device includes a power supply configured to apply a voltage to the resistance; a second resistance whose one end is coupled to the power supply and another end is coupled to the detection line; a voltage measuring part configured to measure the voltage applied to the resistance if the voltage is applied by the power supply; a table which indicates a relationship between a value of the voltage applied to the resistance and the length of the cable; a cable length detecting part configured to detect a length of the cable; and a communication controlling part configured to perform, based on the length of the cable detected by the cable length detecting part, control for ensuring communication quality between the on-vehicle device and the device. The cable length detecting part is configured to detect the length of the cable by referring to the table to determine the length of the cable which is associated with the voltage applied to the resistance measured by the voltage measuring part.

With this arrangement, it is possible to detect the length of the cable by determining the length of the cable which is associated with the voltage applied to the resistance measured by the voltage measuring part.

With the communication controlling part, it is possible to ensure the communication quality between the on-vehicle device and the USB device. For example, the communication controlling part can compensate for the attenuation of the signals transmitted by the signal line of the cable and/or the voltage drop of the power supply voltage supplied to the power supply line of the cable.

According to the embodiments and the variants thereof, a system is provided which includes an on-vehicle device and a cable whose one end is coupled to the on-vehicle device and another end is coupled to a device. The cable has a detection line for detecting the length of the cable, the detection line having a resistance value which is associated with the length of the cable. The on-vehicle device includes a power supply configured to apply a voltage to the detection line; a second resistance whose one end is coupled to the power supply and another end is coupled to the detection line; a voltage measuring part configured to measure the voltage applied to the detection line if the voltage is applied by the power supply; a table which indicates a relationship between a value of the voltage applied to the detection line and the length of the cable; a cable length detecting part configured to detect a length of the cable; and a communication controlling part configured to perform, based on the length of the cable detected by the cable length detecting part, control for ensuring communication quality between the on-vehicle device and the device. The cable length detecting part is configured to detect the length of the cable by referring to the table to determine the length of the cable which corresponds to the voltage applied to the detection line measured by the voltage measuring part.

With this arrangement, it is possible to detect the length of the cable by determining the length of the cable which is associated with the voltage applied to the detection line measured by the voltage measuring part. With the communication controlling part, it is possible to ensure the communication quality between the on-vehicle device and the USB device. For example, the communication controlling part can compensate for the attenuation of the signals transmitted by the signal line of the cable and/or the voltage drop of the power supply voltage supplied to the power supply line of the cable.

The present invention is disclosed with reference to the preferred embodiments. However, it should be understood that the embodiments and the variants thereof are merely described by examples, and variations, substitutions and modifications thereof may be made by those skilled in the art. For convenience of explanation, the devices according to the embodiments of the present invention are described with the functional block diagrams; however, such devices may be implemented by a hardware resource, a software resource or a combination thereof. The present invention is not limited to the above-described embodiments, and thus includes various variations, substitutions and modifications thereof.

The invention claimed is:

1. A control apparatus configured to control communication between an on-vehicle device and a device coupled to the on-vehicle device via a cable, the control apparatus comprising: a cable length detecting part configured to detect a length of the cable; and an amplification factor controlling part configured to control, based on the length of the cable detected by the cable length detecting part, amplitude in a connector connected to the device by changing an amplification factor of a signal supplied to a communication line of the cable wherein, the amplification factor controlling part is configured to control the amplitude in the connector connected to the device by changing the amplification factor of the signal supplied to the communication line of the cable if a combined length of the length of the cable detected by the cable length detecting part and a length of a cable inside the control device exceeds a predetermined length which meets a specification.

2. A control apparatus configured to control communication between an on-vehicle device and a device coupled to the on-vehicle device via a cable, the control apparatus comprising: a cable length detecting part configured to detect a length of the cable; and a power supply voltage controlling part configured to control, based on the length of the cable detected by the cable length detecting part, a power supply voltage in a connector connected to the device by changing a power supply voltage applied to a power supply line of the cable wherein the power supply voltage controlling part is configured to control the power supply voltage in the connector connected to the device by changing the power supply voltage applied to the power supply line of the cable if a combined length of the length of the cable detected by the cable length detecting part and a length of a cable inside the control device exceeds a predetermined length which meets a specification.

3. A control apparatus configured to control communication between an on-vehicle device and a device coupled to the on-vehicle device via a cable, the control apparatus comprising: the cable has a detection line for detecting a length of the cable, and a resistance whose value corresponds to the length of the cable, wherein one end of the resistance is coupled to the detection line and another end of the resistance is coupled to ground, the control apparatus includes: a cable length detecting part configured to detect a length of the cable; and a communication controlling part configured to perform, based on the length of the cable detected by the cable length detecting part, control for ensuring communication quality between the on-vehicle device and the device; a power supply configured to apply a voltage to the resistance; a second resistance whose one end is coupled to the power supply and another end is coupled to the detection line; a voltage measuring part configured to measure the voltage applied to the resistance if the voltage is applied by the power supply; a table which indicates a relationship between a value of the voltage applied to the resistance and the length of the cable; wherein the cable length detecting part is configured to detect the length of the cable by referring to the table to determine the length of the cable which is associated with the voltage applied to the resistance measured by the voltage measuring part.

4. A control apparatus configured to control communication between an on-vehicle device and a device coupled to the on-vehicle device via a cable, the control apparatus comprising: the cable has a detection line for detecting a length of the cable, the detection line having a resistance value which is associated with the length of the cable, the control apparatus includes: a cable length detecting part configured to detect a length of the cable; and a communication controlling part configured to perform, based on the length of the cable detected by the cable length detecting part, control for ensuring communication between the on-vehicle device and the device; a power supply configured to apply a voltage to the detection line; a second resistance whose one end is coupled to the power supply and another end is coupled to the detection line; a voltage measuring part configured to measure the voltage applied to the detection line if the voltage is applied by the power supply; and a table which indicates a relationship between a value of the voltage applied to the detection line and the length of the cable; wherein the cable length detecting part is configured to detect the length of the cable by referring to the table to determine the length of the cable which is associated with the voltage applied to the detection line measured by the voltage measuring part.

5. A system which includes an on-vehicle device and a cable whose one end is coupled to the on-vehicle device and another end is coupled to a device, wherein the cable includes: a detection line for detecting a length of the cable; and a resistance whose value is associated with the length of the cable, wherein one end of the resistance is coupled to the detection line and another end of the resistance is coupled to ground, the on-vehicle device includes: a power supply configured to apply a voltage to the resistance; a second resistance whose one end is coupled to the power supply and another end is coupled to the detection line; a voltage measuring part configured to measure the voltage applied to the resistance if the voltage is applied by the power supply; a table which indicates a relationship between a value of the voltage applied to the resistance and the length of the cable; a cable length detecting part configured to detect a length of the cable; and a communication controlling part configured to perform, based on the length of the cable detected by the cable length detecting part, control for ensuring communication between the on-vehicle device and the device, wherein the cable length detecting part is configured to detect the length of the cable by referring to the table to determine the length of the cable which is associated with the voltage applied to the resistance measured by the voltage measuring part.

6. A system includes an on-vehicle device and a cable whose one end is coupled to the on-vehicle device and another end is coupled to a device, wherein the cable includes: a detection line for detecting a length of the cable, the detection line having a resistance value which is associated with the length of the cable, the on-vehicle device includes: a power supply configured to apply a voltage to the detection line; a second resistance whose one end is coupled to the power supply and another end is coupled to the detection line; a voltage measuring part configured to measure the voltage applied to the detection line if the voltage is applied by the power supply; a table which indicates a relationship between a value of the voltage applied to the detection line and the length of the cable; a cable length detecting part configured to detect a length of the cable; and a communication controlling part configured to perform, based on the length of the cable detected by the cable length detecting part, control for ensuring communication between the on-vehicle device and the device; wherein the cable length detecting part is configured to detect the length of the cable by referring to the table to determine the length of the cable which is associated with the voltage applied to the detection line measured by the voltage measuring part.

* * * * *